United States Patent Office 3,350,055
Patented Oct. 31, 1967

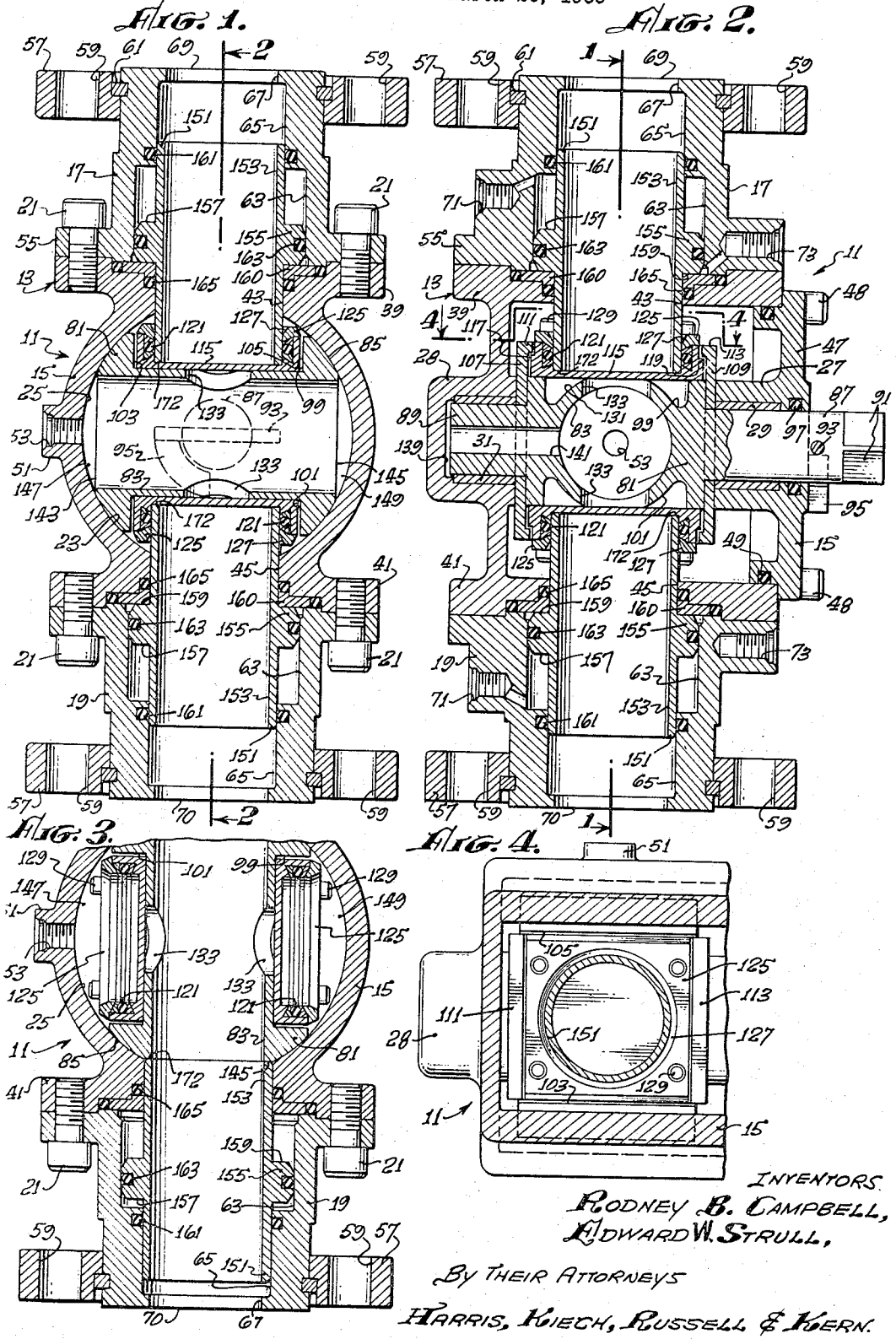

3,350,055
DUAL SEAL SHUTOFF VALVE
Rodney B. Campbell, 1633 Ridgeview Drive, Glendale, Calif. 91207, and Edward W. Strull, 441 N. Citrus Ave., Los Angeles, Calif. 90036
Filed Mar. 26, 1965, Ser. No. 442,871
6 Claims. (Cl. 251—89.5)

ABSTRACT OF THE DISCLOSURE

A spherical shut-off valve having a valve element rotatable between a closed position blocking the passage of fluid through the valve and an open position in which a port through the valve element is aligned with ports in the valve to permit the unobstructed flow of fluid through the valve.

This invention relates to shutoff valves and more particularly to dual seal shutoff valves.

As is well known, a valve functions to control flow of fluid in a conduit. Shutoff valves are generally designed and utilized in either the full open or the full closed position. A shutoff valve should provide a tight seal which will absolutely prevent leakage therethrough in the closed position, and which in the open position will provide an unimpeded flow therethrough so as to reduce to a minimum any turbulence in the flow and the fluid pressure drop across the valve. To avoid inadvertent opening of a closed shutoff valve, it is often considered desirable to provide an easily actuated lock to positively maintain the valve in the closed position and to release the valve to permit it to move to its open position.

Accordingly, it is an object of this invention to provide a valve having novel sealing means which tightly seal against leakage therethrough when the valve is in the closed position.

Another object of this invention is to provide a valve having a movable valve element which is locked in the closed position by a reciprocable sleeve member. Sealing means may be positioned on the reciprocable member and the movable valve element to seal the valve against leakage in the closed position.

A further object of this invention is to provide such a valve in which the reciprocable sleeve member, which locks the valve in the closed position, forms at least a portion of the fluid passageway through the valve. It is also an object of this invention to employ such a reciprocable sleeve member mounted in the valve inlet to lock the movable valve element in its closed position and to release the movable valve element for movement to an open position in which the opening through the sleeve member is communicable with a passageway formed in the movable valve element. Another object is to provide such a sleeve member in the valve outlet.

It is a further object of the invention to provide a cup in a recess in such a valve element, the cup being aligned with the inlet or the outlet of the valve in the closed position of the valve and being adapted to receive the reciprocable sleeve in sealing relation to lock the movable valve element in the closed position. According to a further object of this invention means are provided for moving the cup to precisely align the cup with the reciprocable sleeve member when the latter moves to the closed position.

Briefly stated, the objects of this invention may be accomplished by providing a housing having a fluid passageway therethrough and a movable valve element having a passage therethrough and movable between an open position in which the passage forms a portion of the fluid passageway and a closed position in which the movable valve element blocks the fluid passageway. A reciprocable sleeve member, having an opening therethrough, forms a second portion of the fluid passageway and is reciprocable between a first position in which it engages the valve element to lock same in the closed position and a second position in which it is free of said valve element to permit same to be moved to the open position. Actuating means moves the valve element between the open and closed positions and control means reciprocate the sleeve member between its first and second positions. Sealing means are also provided for sealing between the movable valve element and the reciprocable sleeve member when the latter is in its first position. In a preferred embodiment, the locking means include a recess opening in the outer surface of the movable valve element and in general alignment with the reciprocable sleeve member in the closed position of the valve element. In the first position of the reciprocable sleeve member, it is received in the recess to lock the movable valve element in its closed position, and in the second position of the sleeve member it is out of the recess, thereby allowing the valve element to be moved to its open position. In a preferred construction, a cup having an annular seal therein is loosely secured in the recess to receive the reciprocable sleeve member in sealing relation in the first position thereof. In a preferred embodiment, the movable valve element is a rotor which rotates between its open and closed positions on an axis normal to the main fluid passage through the valve.

The invention, both as to its organization and method of operation, together with further objects and advantages thereof, may best be understood by reference to the following description taken in connection with the accompanying drawing.

In the drawing:

FIG. 1 is a sectional longitudinal view taken along line 1—1 of FIG. 2, showing the valve in its closed position;

FIG. 2 is a sectional view taken along line 2—2 of FIG. 1;

FIG. 3 is a fragmentary longitudinal sectional view similar to FIG. 1 showing the valve in its open position; and FIG. 4 is a fragmentary cross-sectional view taken along line 4—4 of FIG. 2.

Referring to the drawing, shutoff valve 11 has a housing 13 including a main body 15, an inlet extension 17, and an outlet extension 19, the extensions being secured to the ends of the main body by a plurality of screws 21. Although the extension 17 has been designated as the inlet extension, it should be understood that flow through the valve may be in either direction and, accordingly, in actual use the extension 17 could be the outlet.

The main body 15 provides a generally cylindrical cavity 23 having smooth curved walls 25 and aligned tubular bosses 27 and 28, which support sleeve bushings 29 and 31. Annular apertured flanges 39 and 41 are provided at each end of the main body 15 to receive the screws 21. The main body 15 adjacent its ends has axially aligned bores 43 and 45, the axis of which is perpendicular to the axis of the bosses 27 and 28. It is preferred that the tubular boss 27 be integral with an end plate 47 which is suitably secured to the remainder of the main body such as by screws 48 and fluid sealed thereto by an O-ring 49. A boss 51 on the main body 15 extends outwardly therefrom and contains a relief port 53 which communicates with the cylindrical cavity 23.

The inlet extension 17 is identical with the outlet extension 19 and, accordingly, only the inlet extension 17 will be described in detail. Corresponding reference numerals are used to designate the corresponding elements of the inlet extension 17 and the outlet extension 19. The inlet extension 17 has an annular apertured flange 55 at the inner end thereof, which is held in tight engagement with the flange 39 by the screws 21. An annular retaining flange 57 having a plurality of bolt holes 59 is secured to the outer end of the inlet extension by a retaining ring 61. Axially aligned cylindrical bores 63, 65, and 67 of progressively smaller diameter in the extension 17 extend from the bore 43 in the main body 15 to an inlet or first open end 69. The corresponding aligned bores 63, 65, and 67 in the outlet extension 19 extend to an outlet 70.

A fluid supply port 71 (FIG. 2) passes through the wall of the inlet extension 17 to the end of the large bore 63. A fluid supply port 73 extends through the wall of the inlet extension 17 opposite the port 71 and adjacent to the end of the bore 63 which is adjacent the bore 43.

A rotatable valve element 81 having a cylindrical passage 83 therethrough is mounted for movement between a closed position (FIGS. 1 and 2) and an opened position (FIG. 3). The valve element 81 has a generally cylindrical outer surface 85 mating with the smooth curved surface 25 of the main body 15, an axially extending control or actuating shaft 87 (FIG. 2), and an axially extending stub shaft 89, both of which are generally cylindrical and journalled for rotation in the bushings 29 and 31, respectively. The control shaft 87 extends outside of the end plate 47 and is provided with four flats 91 (only two are shown) adapted for connection to means (not shown) for rotating the valve element 81 between the opened and the closed positions. To limit the amount of rotation, the shaft 87 carries a stop pin 93 extending completely therethrough (FIG. 1) and which is adapted to engage a fixed abutment 95 formed on the end plate 47. The abutment 95 and the stop pin 93 are so positioned on the end plate 47 and the shaft 87, respectively, that one end of the stop pin will engage one side of the abutment in the opened position of the valve and the other end of the stop pin will engage the other side of the abutment in the closed position of the valve, thus indexing the movement of the valve element 81. An O-ring 97 is provided to seal between the shaft 87 and the end plate 47.

Two opposed square recesses 99 and 101 are provided in the outer surface of the movable valve element 81 and are axially aligned with the bores 63, 65, and 67 and with the axially aligned apertures 43 and 45. As both of the recesses 99 and 101 and the elements they contain are identical, only the recess 99 and the elements disposed therein will be described in detail. The identical parts which are disposed in the recesses 99 and 101 are identified by corresponding reference numerals.

The recess 99 is formed by opposed walls 103 and 105 (FIGS. 1 and 4) and two apertured plates 107 and 109 (FIG. 2) rotatable with the movable valve element 81 and having inwardly extending lips 111 and 113. A cup 115, which is generally rectangular in cross section, is loosely secured in the recess 99 by the lips 111 and 113 under which a pair of shoulders 117 and 119 are slidably fit. Thus, the cup 115 is mounted to float in the recess 99. An annular fluid seal 121 is retained in the cup 115 by a retaining element 125 having a sloping camming surface 127 and a plurality of screws 129 fasten the retaining element 125 to the valve element 81.

The recess 99 has an arcuate bottom wall 131 with an opening 133 formed therein which connects the bottom of the cup 115 and the passage 83. The end of the stub shaft 89 is spaced slightly from the end wall of the boss 28 to form a small chamber or clearance space 139 which is in communication with the passage 83 by a relief passage 141 which extends axially through the stub shaft 89. The valve element 81, although being generally cylindrical, has opposed external flat faces 143 and 145 which are spaced from the smooth curved wall 25 to define in the closed position two relief chambers 147 and 149 (FIG. 1). In the open position of the valve, the retaining elements 125 (FIG. 3) are spaced from the curved wall 25 to define the relief chambers 147 and 149.

A cylindrical reciprocable sleeve 151 having a cylindrical opening 153 therethrough is slidably mounted in the bores 63, 65, and 43 and an identical sleeve 151 is slidable adjacent the outlet 70. The reciprocable sleeve 151 is slidable between a locking position (FIGS. 1 and 2), in which it is received in the recess 99 and in the cup 115 to lock the movable valve element 81 in the closed position, and a releasing position in which it is out of the recess to allow the movable valve element to be rotated to the opened position. The opening 153 communicates with the passage 83 when the valve is in the open position (FIG. 3), being axially aligned therewith and of the same internal diameter, to form substantially continuous fluid passage through the valve. The sleeve 151 has an integral annular flange 155, which forms a piston, having an outer end face 157 and an inner end face 159, the latter engaging a seat 160 in the closed position of the valve.

Sealing means are provided for forming a fluid seal between the sleeve 151 and the housing 13, including an O-ring 161 in the inlet extension 17, an O-ring 163 in the annular flange 155, and an O-ring 165 in the bore 43.

When the reciprocable member 151 is in the locking position (FIGS. 1 and 2), it is received in the cup 115 and it is engaged by the annular seal 121 in sealing relation. In this position, the valve element 81 cannot be moved from the closed position and the sleeve 151, the cup 115, and the annular seal 121 provide a fluid-tight sealing means. In the releasing position (FIG. 3), the sleeve 151 is not in the recess 99 or in the cup 115, and, accordingly, appropriate means may rotate the valve element 81 to its open position. In the open position, the passage 83 and the opening 153 form continuous and smooth portions of the fluid passageway which extends through the valve.

Control means are provided to reciprocate the sleeve 151 between the locking and the releasing positions of the valve 81. To move the sleeve 151 to the releasing position, the fluid supply port 73 is connected to a source of fluid under pressure and the supply port 71 is connected to a low pressure or discharge point, by suitable valving (not shown). This creates an outwardly acting fluid pressure differential across the piston 155 which moves the sleeve 151 outwardly to its releasing position. Conversely, to move the sleeve 151 inwardly to its locking position the fluid pressures in the ports 71 and 73 are reversed by such valving, high pressure fluid being admitted through the port 71 and the port 73 being connected to a low pressure discharge point, which creates an inwardly acting fluid pressure differential across the piston 155, which moves the sleeve 151 inwardly to its locking position.

Means are provided for moving the cup 115 into precise alignment with the sleeve 151 when the latter moves inwardly to the locking position. As the sleeve 151 moves toward the cup 115, an end 172 thereof will engage the sloping camming surface 127 to cam the loosely mounted or floating cup 115 into precise alignment with the reciprocable member.

Briefly stated, the operation of the valve is as follows. With the valve locked in the closed position (FIGS. 1 and 2), both of the sleeves 151 and the annular seals 121 provide fluid-tight sealing means and the valve element 81 is securely locked. When it is desired to open the valve, fluid pressure is admitted through the ports 73 to move the two sleeves 151 to their releasing positions in which they are no longer received in the cups 115. By manually or mechanically turning the shaft 87, the movable valve element 81 is rotated to its opened position in which the passageway 83 is aligned with the opening 153 in the reciprocable members and the inlet 69 and the outlet 70. As shown in FIG. 3, the sleeve 151 may be moved slightly toward the closed position so that the end 172 engages the flat face 145 to lock the movable valve element in the open position. The engagement of the stop pin 93 with the abutment 95 prevents the movable valve element 81 from being rotated past the open position. Thus, in the open position, the passage 83 and the openings 153 form portions of the fluid passageway which extends through the valve. The valve may be turned to the closed position by rotation of the shaft 87 until the stop pin 93 engages the other end of the abutment 95. In this position, the passage 83 is out of alignment with the inlet 69 and the outlet 70 to thereby allow the movable valve element to block the fluid passageway through the valve.

In the preferred embodiment illustrated, the rotational axis of the movable valve element 81 is perpendicular to the axis of flow, i.e., the longitudinal axis of the reciprocable members 151. It should be understood, however, that other angular relationships may exist between these axes. It will also be apparent to those having ordinary skill in the art that the inventive concept described herein may be employed on valves which are not of the rotary type.

The outer surface of the valve member 81 makes a loose fit with the curved walls 25 of the cylindrical cavity 23, to permit fluid leakage therebetween. This largely equalizes the radial fluid pressures acting on the outside of the valve member 81 and the valve member may be readily rotated between its open and closed positions, and vice versa, and this is an important feature of the invention, eliminating the fluid binding forces found in most rotary valves of the prior art. In the closed and locked position of the valve (FIGS. 1 and 2) upstream fluid pressure in the inlet 69 will be exerted on the interior of the cup 115 over the circular area enclosed by the periphery of the sleeve 151, but the fluid pressure acting on this area creates excessive forces on the valve member 81. When the valve element 81 is not locked against rotation radial fluid pressures acting thereon are substantially equal and, accordingly, there is no binding.

Although two locking sleeves 151 have been shown and described, it is to be understood that the lower sleeve and its supply ports 71 and 73, adjacent to the outlet, may be omitted if desired, it being necessary in most installations only to provide the sleeve 151 and ports 71 and 73 in the inlet side of the valve. By using the double sleeve construction as illustrated, the valve is fully reversible, either side being connected to the high pressure side of the line and the other side being connected to the low pressure side of the line. The latter is an advantage, of course, because it permits reversal of the valve in the line after an extended period of service, to compensate for wear in the moving parts and fluid seals.

It is also to be noted that the relief port 53 may be omitted or plugged, as desired. It has been included only to satisfy the specification of some users of such valves, and, while beneficial, is not essential.

The primary advantages of the valve of this invention are that it provides a movable valve member which is securely locked in its closed position, in which full fluid seals substantially eliminate leakage past the valve, the locking and unlocking of the valve member being readily controlled by a conventional hydraulic control system, the valve member being easily moved between its closed and open positions and vice versa, because of the substantial reduction of fluid pressure on the movable valve member. Furthermore, in its open position, the valve provides a substantially continuous, smooth fluid passage therethrough, of substantially uniform diameter, which reduces fluid pressure drop across the valve member substantially to zero and minimizes turbulence in fluid flow through the valve. Also, the seals are not in the line of flow nor disturbed by flow.

The fluid system for controlling the supply of fluid to and from the supply ports 71 and 73, and the valving therefor, where a pair of sleeve elements 151 is employed, are preferably designed to simultaneously impose oppositely directed fluid pressure differentials on the pistons 155 to synchronize the movements of the sleeves so that both move towards and into locking relationship with the valve member 81 at the same time, and both move away from the valve member and out of such locking relationship at the same time, and this is a feature of the invention. This is accomplished simply by connecting the fluid lines communicating with the two supply ports 71 in parallel or together and connecting the fluid lines communicating with the two supply ports 73 in parallel or together.

Many changes, modifications, and substitutions can be made by one having ordinary skill in the art without departing from the spirit and scope of this invention, and we do not desire to be limited to the specific embodiment described herein, but desire to be afforded the full scope of the following claims.

We claim:
1. In a valve, the combination of:
a housing having a fluid passageway therethrough and a cylindrical cavity in the line of said passageway;
a rotatable cylindrical valve element in said cavity, with sufficient clearance between the exterior of said valve element and the wall of said cavity to permit fluid leakage therebetween to distribute equalized radial fluid forces on the exterior of said valve element, said valve element having a passage therethrough, said valve element being rotatable between an open position in which said passage forms a first portion of said passageway and a closed position in which said valve element blocks said passageway, said equalized radial fluid forces facilitating the rotation of said valve element between its said open and closed positions, said valve element having a recess in its exterior surface in the line of said passageway when said valve element is in its closed position;
a reciprocable sleeve member having an opening therethrough forming a second portion of said passageway, said sleeve member being reciprocable between a first position in which it is received within said recess to lock said valve element in said closed position, and a second position in which it is free of said recess to permit said valve element to be rotated to said open position;
actuating means for rotating said valve element between its said open and closed positions;
control means for reciprocating said sleeve member between its said first and second positions; and
sealing means for forming a fluid seal between said sleeve member and said valve element when said valve element is in its said closed position and said sleeve member is in its said first position.

2. In a valve, the combination of:
a housing having a fluid passageway therethrough and a cylindrical cavity in the line of said passageway;
a rotatable cylindrical valve element in said cavity, with sufficient clearance between the surface exterior of said valve element and the wall of said cavity to permit fluid leakage therebetween to distribute fluid forces on the exterior of said valve element, said valve element having a passage therethrough, said valve element being rotatable between an open position in which said passage forms a first portion of said passageway and a closed position in which said valve element blocks said passageway, said valve element having a recess in said exterior surface in the line of said passageway when said valve element is in its closed position;
a reciprocable sleeve member having an opening therethrough forming a second portion of said passageway, said sleeve member being reciprocable between a first position in which its inner end is received within said recess and engages said valve element to lock the same in said closed position, and a second position in which it is free of said valve element to permit the same to be rotated to said open position;

actuating means for rotating said valve element between its said open and closed positions;

control means for reciprocating said sleeve member between its said first and second positions; and sealing means for forming a fluid seal between said sleeve member and said valve element when said valve element is in its said closed position and said sleeve member is in its said first position, said sealing means including a cup loosely carried within said recess of said valve element and having an annular seal on its interior side face and into which the the inner end of said sleeve member is adapted to enter in sealing relationship, said cup and said sleeve member being self-aligning.

3. In a valve, the combination of:

a housing having a fluid passageway therethrough;

a movable valve element in the line of said passageway and having a passage therethrough, said valve element being movable between an open position in which said passage forms a first portion of said passageway and a closed position in which said valve element blocks said passageway, said valve element having a recess in its exterior surface in the line of said passageway when said valve element is in its closed position;

a reciprocable sleeve member having an opening therethrough forming a second portion of said passageway, said sleeve member being reciprocable between a first position in which it is received within said recess to lock said valve element in said closed position, and a second position in which it is free of said recess to permit said valve element to be moved to said open position;

actuating means for moving said valve element between its said open and closed positions;

control means for reciprocating said sleeve member between its said first and second positions; and sealing means for forming a fluid seal between said sleeve member and said valve element when said valve element is in its closed position and said sleeve member is in its first position, said sealing means including a cup loosely carried within said recess of said valve element and having an annular seal on its interior side face and into which the inner end of said sleeve member is adapted to enter in sealing relationship.

4. A valve as defined in claim 3 wherein said cup and said sleeve member are self-aligning.

5. In a valve adapted for use in a reversible flow line, the combination of:

a housing having a fluid passageway therethrough;

a movable valve element in the line of said passageway and having a passage therethrough, said valve element being movable between an open position in which said passage forms an intermediate portion of said passageway and a closed position in which said valve element blocks said passageway, said valve element having two opposed recesses in its exterior surface in the line of said passageway when said valve element is in its closed position;

two opposed reciprocable sleeve members, each having an opening therethrough, said openings forming opposed outer portions of said passageway, each of said sleeve members being reciprocable between a first position in which it is received within one of said recesses to lock said valve element in said closed position, and a second position in which it is free of said recess to permit said valve element to be moved to said open position;

actuating means for moving said valve element between its said open and closed positions;

control means for reciprocating each of said sleeve members between its said first and second positions; and first and second sealing means for forming, respectively, a fluid seal between one of said sleeve members and said valve element and the other of said sleeve members and said valve element when said valve element is in its closed position and said respective sleeve member is in its first position, each of said sealing means including a cup loosely carried within a respective recess of said valve element and having an annular seal on its interior side face and into which the inner end of said respective sleeve member is adapted to enter in sealing relationship.

6. A valve as defined in claim 5 wherein said control means simultaneously reciprocates both of said sleeve members between said first and second positions.

References Cited

UNITED STATES PATENTS

| 783,953 | 2/1905 | Henry | 251—172 |
| 2,109,042 | 2/1938 | Bennett | 251—172 |
| 2,653,004 | 9/1953 | Schnyder | 251—172 |
| 3,013,766 | 12/1961 | Dawson | 251—172 X |
| 3,219,047 | 11/1965 | Kircher | 137—68 |

CLARENCE R. GORDON, *Primary Examiner.*

UNITED STATES PATENT OFFICE

CERTIFICATE OF CORRECTION

Patent No. 3,350,055                          October 31, 1967

Rodney B. Campbell et al.

It is hereby certified that error appears in the above numbered patent requiring correction and that the said Letters Patent should read as corrected below.

Column 6, lines 57 and 58, for "surface exterior" read -- exterior surface --.

Signed and sealed this 26th day of November 1968.

(SEAL)
Attest:

Edward M. Fletcher, Jr.
Attesting Officer

EDWARD J. BRENNER
Commissioner of Patents